US012713331B2

(12) United States Patent
Taft et al.

(10) Patent No.: US 12,713,331 B2
(45) Date of Patent: Aug. 18, 2026

(54) MULTI-OPERATOR 5G NETWORK SLICING SERVICE SELECTION

(71) Applicant: Verizon Patent and Licensing Inc., Basking Ridge, NJ (US)

(72) Inventors: David Taft, Keller, TX (US); Jerry Steben, Fort Worth, TX (US); Lap Tse, Marietta, GA (US); Maqbool Chauhan, Keller, TX (US); Samirkumar Patel, Middlesex, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 468 days.

(21) Appl. No.: 18/448,450

(22) Filed: Aug. 11, 2023

(65) Prior Publication Data

US 2025/0056381 A1 Feb. 13, 2025

(51) Int. Cl.

| | |
|---|---|
| ***H04W 4/50*** | (2018.01) |
| ***H04W 8/18*** | (2009.01) |
| ***H04W 48/08*** | (2009.01) |
| ***H04W 60/06*** | (2009.01) |

(52) U.S. Cl.

CPC .......... *H04W 48/08* (2013.01); *H04W 8/183* (2013.01)

(58) Field of Classification Search

None

See application file for complete search history.

(56) References Cited

U.S. PATENT DOCUMENTS

2022/0345862 A1* 10/2022 Wang ...................... H04W 4/50
2023/0308855 A1* 9/2023 Matolia ................. H04W 8/183

* cited by examiner

*Primary Examiner* — Gary Lafontant

(57) ABSTRACT

Systems and methods described herein enable network slice selection from different service providers using embedded Subscriber Identity Modules (eSIMs). A user equipment (UE) device stores a first eSIM associated with a first service provider of a first mobile network and a second eSIM associated with a second service provider of a second mobile network. The UE device also stores policy rules governing selection of the first eSIM and the second eSIM, wherein the policy rules limit use of second eSIM to a network slice on the second mobile network. The UE device initiates a session connection request associated with an application and directs the session connection request through one of the first eSIM or the second eSIM based on the policy rules.

20 Claims, 8 Drawing Sheets

300
INPUT COMPONENT 340
OUTPUT COMPONENT 350
COMMUNICATION INTERFACE 360
BUS 310
MEMORY 330
PROCESSOR 320

600

MULTI-OPERATOR 5G NETWORK SLICING SERVICE SELECTION

BACKGROUND INFORMATION

A Public Land Mobile Network (PLMN) is typically designed to support mobile devices over an extensive geographic area (e.g., national or regional coverage). Next generation PLMNs, such as Fifth Generation (5G) mobile networks, incorporate network slicing technology to increase network efficiency and performance. Network slicing is a type of virtualized networking architecture that involves partitioning a single physical network into multiple virtual networks. The partitions, or slices, of the virtualized network may be customized to meet the specific needs of applications, services, devices, customers, or operators. Each network slice can have its own architecture, a provisioning management system, and a security system that support a particular application or service.

Embedded Subscriber Identity Modules (embedded SIMs or eSIMs) may be a practical alternative to traditional removable SIM cards containing subscription credentials. While providing a comparable level of security with many design advantages over the removable SIM (e.g., being usable in a companion class of devices, such as wearables, etc.), eSIM technology provides for a user experience distinct from that of using a SIM card with respect to activating user equipment (UE) devices for use on a mobile network operator (MNO) network.

DETAILED DESCRIPTION

Figure 1:
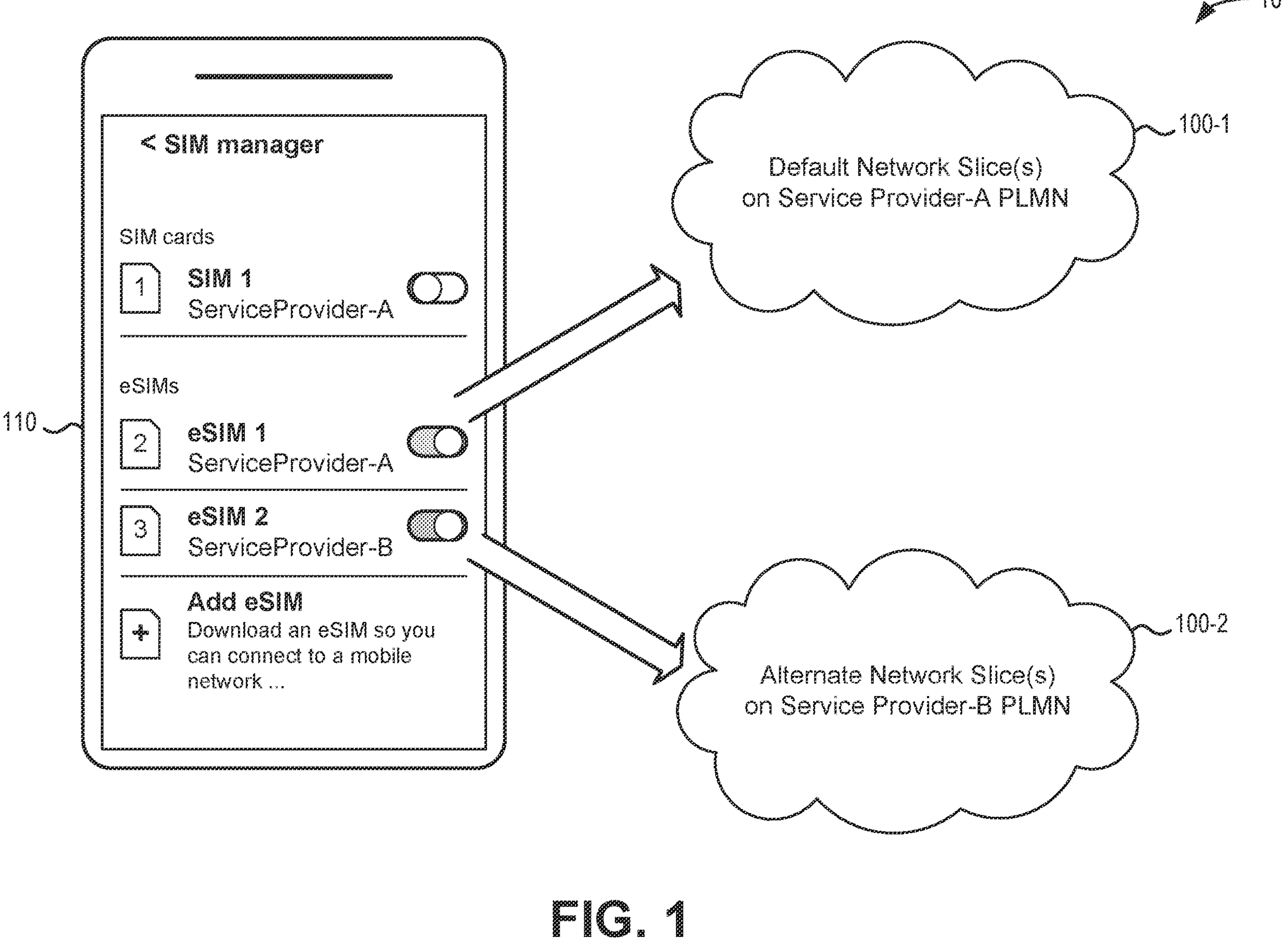
FIG. 1 is a diagram illustrating concepts described herein.

The following detailed description refers to the accompanying drawings. The same reference numbers in different drawings may identify the same or similar elements. Also, the following detailed description does not limit the invention.

The embedded Subscriber Identity Module (eSIM) solution offers benefits to Mobile Network Operators (MNOs), User Equipment (UE) device distributors, UE device manufacturers, and UE device users that may not be provided by other technology (i.e., physical SIM cards). For example, UE device supply chain processes may be optimized while reducing customization requirements of UE devices for specific MNOs and/or operating regions. Furthermore, eSIM technology may provide for simplified subscription management, for example, when activating UE devices or changing MNOs (also referred to herein as "service providers").

eSIM technology involves an initial cellular service activation without an active SIM profile. For example, a user may wish to activate a UE device obtained from an MNO, distributor, or retailer and may wish to remotely activate the UE device to enable services on the MNO's cellular network. To activate the UE device, the MNO may provision a network service using a designated eSIM profile, which is downloaded to the UE device from a remote provisioning platform and/or system. Provisioning may involve installation of a service provider application on the UE device by using an activation voucher/code (e.g., a quick response (QR) code contained in printed material, shown on a display at a point of sale, attached to an email, etc.) that contains the address (e.g., a fully qualified domain name (FQDN)) of the MNO's remote SIM provisioning system. Alternatively, activation may involve preloading of an MNO-specific application or an MNO-specific entitlement server address on the UE device by the manufacturer.

The UE Route Selection Policy (URSP) is used by MNOs to manage access to specific logical networks from the device. These logical networks are referred to as network slices. Each network slice can have its own architecture, provisioning management system, and security system that support a particular application or service. For example, a network slice may be configured to support general Internet traffic, while another network slice may be configured to support certain low-latency applications.

While eSIM capability is used to provide the customer with the ability to select MNOs through software rather than a physical SIM, network slice service offerings and capabilities are not available through eSIMs today. Systems and methods described herein combine and extend network slice offerings and eSIM capabilities to customers by increasing service flexibility and options to network slices through multiple MNOs.

More particularly, according to implementations described herein, the existing 3GPP-based URSP framework may be modified or a new policy (referred to herein as an Application Route Selection Policy (A-RSP)) may be used to enable eSIM capabilities on a network slice basis. This functionality can be based on numerous characteristics, such as certification repository, application, service provider, slice provider, performance, bandwidth, latency, jitter, reliability, etc. Thus, systems and methods described herein give the customer the ability to decide and choose a desired network for particular applications and/or services (e.g., best performing, most reliable, reliable enough, etc.), while maintaining a primary (or default) service provider.

FIG. 1 illustrates concepts described herein. A system 10 may include multiple mobile networks 100-1 and 100-2 (referred to collectively as mobile networks 100 or generically as mobile network 100) that support network slicing and a UE device 110 (also referred to herein as UE 110). System 10 may include additional mobile networks 100, although two mobile networks 100 are illustrated in FIG. 1 for simplicity.

Each mobile network 100 (also referred to herein as "network 100") may include a PLMN and possibly one or more other networks (not shown in FIG. 1) that provide wireless (e.g., Radio Frequency (RF)) communication with UE 110. Mobile network 100 may be composed of subnetworks, such as a RAN and a core network, as described further herein. According to an implementation, each mobile network 100 may use a unique PLMN identifier (ID).

UE 110 may be configured with multiple eSIMs, such as "eSIM 1" and "eSIM 2" illustrated on the user interface of UE 110. Each of "eSIM 1" and "eSIM 2" may be associated with a different service provider (e.g., "ServiceProvider-A" and "ServiceProvider-B") that operates a different mobile network 100. As described further herein, a user of UE 110 may subscribe to different network slice services with the different service providers. For example, a user's subscription with Service Provider-A may support a typical service and data plan for general use, while a user's subscription with Service Provider-B may provide a network slice that supports low-latency communications. Once provisioned, eSIM 1 and eSIM 2 may be activated by a user (e.g., by toggling an on/off mechanism associated with each provisioned eSIM). Use of each activated eSIM may be further governed by a customer profile, a modified URSP ruleset, or A-RSP rules, as described further herein. As an example implementation, eSIM 2 may be restricted to use of a particular network slice by a particular application, while eSIM 1 may be used to provide network access to mobile network 100-1 as a default for other voice and data connections.

Figure 2:
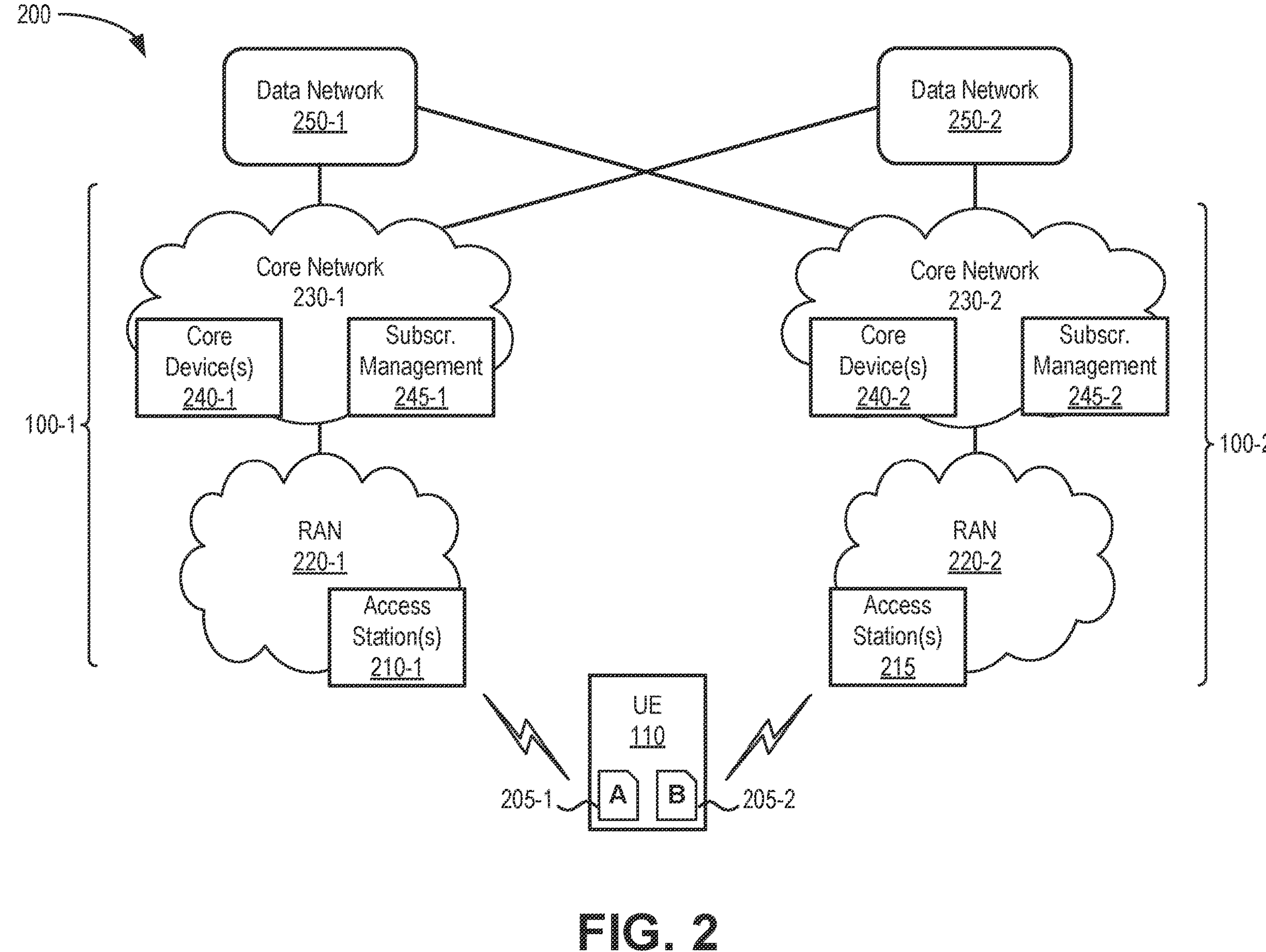
FIG. 2 illustrates an example network environment in which the systems and methods described herein may be implemented.

FIG. 2 is simplified diagram of a network environment 200 in which systems and methods described herein may be implemented. As shown in FIG. 2, environment 200 may include UE 110, mobile network 100-1, and mobile network 100-2. Mobile network 100-1 may include a RAN 220-1 and a core network 230-1. Mobile network 100-2 may include a RAN 220-2 and a core network 230-2. Network environment 200 may also include one or more data networks 250-1, 250-2, etc.

UE device 110 may include any device with wireless communication functionality (e.g., cellular or mobile wireless network) that supports eSIMs. For example, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable or stationary computer; an automobile or vehicle; a desktop computer; a customer premises equipment (CPE) device, such as a set-top box or a digital media player (e.g., Apple TV, Google Chromecast, or Amazon Fire TV), a WiFi access point, a small cell device, and a smart television; a portable gaming system; an Internet of things (IoT) device; a sensor device; and/or any other type of computer device with wireless communication capabilities. UE device 110 may include capabilities for voice communication, mobile broadband services (e.g., video streaming, real-time gaming, premium Internet access etc.), best effort data traffic, and/or other types of applications. Using eSIMs, UE device 110 may be provisioned with different network credentials (e.g., different international mobile subscriber identifiers (IMSIs)) to access different mobile networks 100.

UE 110 may be registered with network 100-1 and include an eSIM 205-1, illustrated as eSIM A in FIG. 2, for network access. The eSIM may store a user (or a subscriber) credentials associated with accessing network 100-1. Furthermore, to enable UE 110 to receive services from other networks (e.g., network 100-2), UE 110 may also include a separate eSIM 205-2, illustrated as eSIM B in FIG. 2, with credentials for accessing network 100-2.

Mobile network 100-1 may be associated with a MNO or service provider. Mobile network 100-1 may include RAN 220-1 with one or more access stations 210-1 and core network 230-1 with one or more core devices 240-1. RAN 220-1 may allow UE 110 to access core network 230-1. To do so, RAN 220-1 may establish and maintain, with participation from UE 110, an over-the-air channel with UE 110 and maintain backhaul channels with core network 230-1. RAN 220-1 may convey information through these channels, from UE 110 to core network 230 and vice versa.

RAN 220-1 may include an LTE radio network, a Next Generation (NG) radio access network (e.g., Fifth Generation (5G) radio access network) and/or another advanced radio network. These radio networks may operate in many different frequency ranges, including millimeter wave (mmWave) frequencies, sub 6 GHz frequencies, and/or other frequencies. RAN 220-1 may include multiple base stations (e.g., eNodeBs, gNodeBs, or other base stations), Central Units (CUs), Distributed Units (DUs), Radio Units (RUS), and/or Integrated Access and Backhaul (IAB) nodes, referred to collectively herein as access stations 210-1. Access station 210-1 may establish and maintain over-the-air channels with UEs 110 and backhaul channels with core network 230-1.

Core network 230-1 may include one or multiple networks of one or multiple network types and technologies. For example, core network 230-1 may be implemented to include a Next Generation Core (NGC or 5GC) network, an Evolved Packet Core (EPC) of an LTE network, an LTE-Advanced (LTE-A) network, and/or an LTE-A Pro network, a future generation core network (e.g., a 6G or beyond core network, etc.), and/or another type of core network. Core network 230 may allow the delivery of Internet Protocol (IP) services to UE 110 and may interface with other networks, such as data network 250.

Core network 230-1 may include various core devices 240-1. Depending on the implementation, core devices 240-1 may include 5G core network components (Unified Data Management (UDM) function, an Access and Mobility Management Function (AMF), an Authentication Server Function (AUSF), and a Unified Data Repository (UDR), etc.) and/or 4G core network components (e.g., a Serving Gateway (SGW), a Packet data network Gateway (PGW), a Mobility Management Entity (MME), a Home Subscriber Server (HSS), an Authentication Authorization and Accounting (AAA) server, a Policy and Charging Rules Function (PCRF), etc.). Core devices 240-1 may also include other 4G and/or 5G core network components, including combined 4G/5G network components. According to an embodiment, core network 230-1 may include some or all of a subscription management platform 245-1, as described herein.

Components of mobile network 100-1 may be associated with a service provider (e.g., Service Provider A) to provides access to subscribers. Subscription management platform 245-1 may include one or more computing devices or systems that act as a backend for mobile network 100-1. For example, subscription management platform 245-1 may include one or more devices configured for creation, download, remote management (e.g., enable, disable, update, delete), and/or security of MNO credentials (e.g., a SIM profile). SM platform 245-1 may include a database that is configured to store records of eSIM profiles associated with UEs 110. SM platform 245-1 may include one or more devices that operate as a mobile device management (MDM) server associated with a wireless MNO network. According to an implementation, subscription management platform 245-1 may include billing-related systems/databases, an electronic telephone number inventory (ETNI), a mobile terminating access service (MTAS), etc.

Mobile network 100-2 may include a PLMN associated with a different MNO than mobile network 100-1. Similar to mobile network 100-1, mobile network 100-2 may include a RAN 220-2 and a core network 230-2. RAN 220-2 and core network 230-2 may include components similar to those described above in connection with RAN 220-1 and a core network 230-1. For example, RAN 220-2 may include one or more access stations 210-2 that support an LTE radio network, a NG RAN, and/or another advanced radio network. Core network 230-2 may include core devices 240-2. Similar to core devices 240-1 described above, core devices 240-2 may include core network components, including 4G or 5G core network components, future generation components and/or combined network components. Mobile network 100-2 may further include a subscription management platform 245-2 that, in a manner similar to subscription management platform 245-1, manages eSIMs and eSIM profiles for mobile network 100-2. Mobile network 100-2 may also include additional components that are not shown in FIG. 2 for simplicity.

Generally, mobile network 100-2 may have an overlapping coverage area (e.g., regional, national, international) with mobile network 100-1. For example, access stations 210-2 of mobile network 100-2 may provide numerous overlapping cells (or coverage areas) with mobile network 100-1. Thus, while RAN 220-1 and RAN 220-2 are shown separately in FIG. 2, in many geographic areas, coverage of RAN 220-1 may overlap coverage of RAN 220-2. However, mobile network 100-1 and mobile network 100-2 may provide different levels of services and have different levels of availability of different network slices, some of which may be preferable for certain customers in certain regions. As examples, an application being used on UE device 110 may be certified on one of the available networks 100 or a particular network 100 may offer preferred treatment for an application.

Data networks 250 may include one or more networks that are external to core networks 230. In some implementations, data networks 250 may include packet data networks, such as an Internet Protocol (IP) network. In another implementation, data networks 250 may be part of one of core networks 230. Data network 250 may provide particular network services, such as, for example, Voice-over-IP (VOIP) services, messaging services, video services, gaming services, V2X services, etc.

Figure 3:
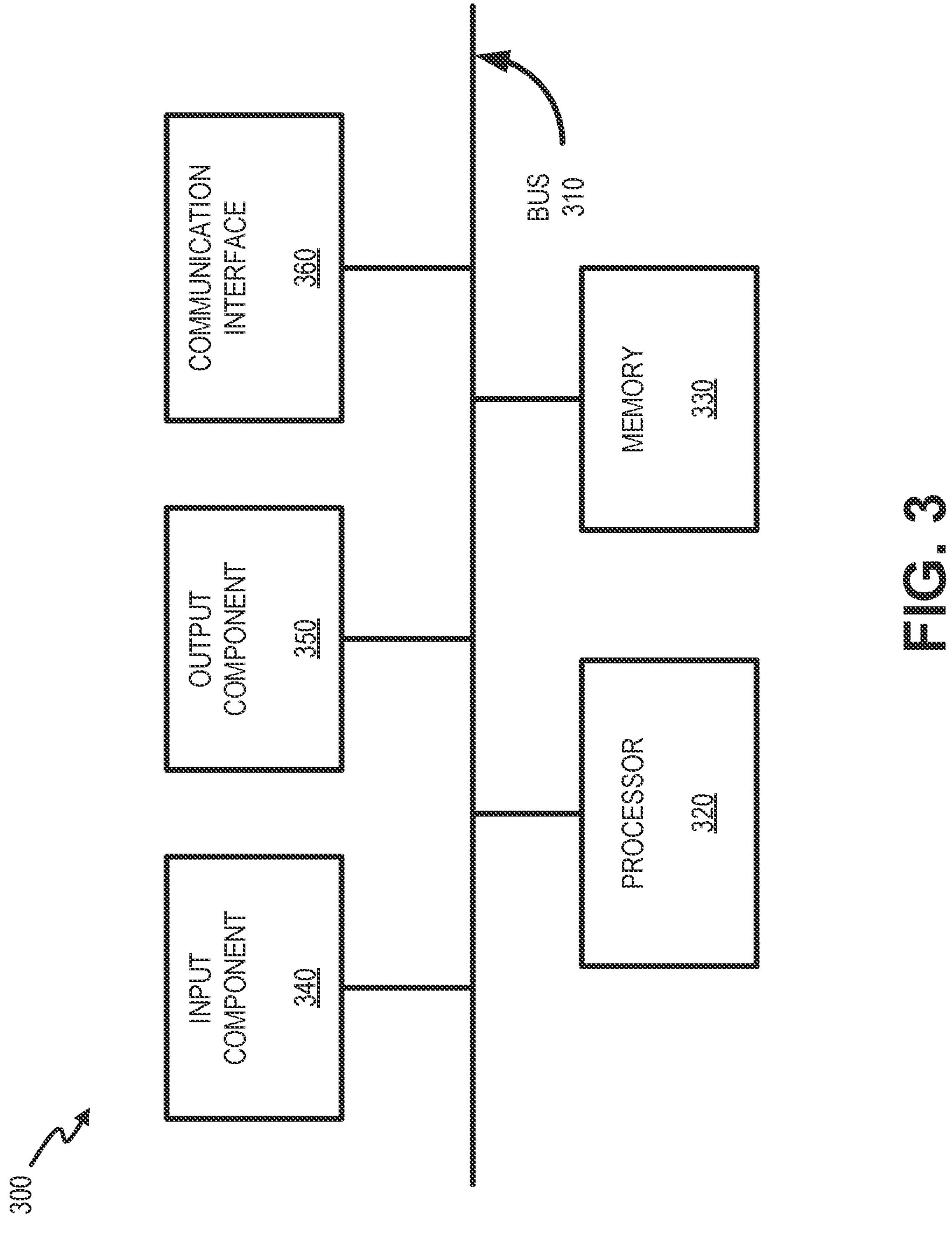
FIG. 3 depicts example components of a device described herein.

FIG. 3 is a diagram illustrating exemplary components of a device 300. Device 300 may correspond to or include, for example, UE device 110, access stations 210, core devices 240, or another component of network environments 200. Alternatively, or additionally, UE device 110, access station 210, core device 240, or the other components of network environment 100 may include one or more devices 300 and/or one or more components of device 300.

Device 300 may include a bus 310, a processor 320, a memory 330, an input component 340, an output component 350, and a communication interface 360. Although FIG. 3 shows exemplary components of device 300, in other implementations, device 300 may contain fewer components, additional components, different components, or differently arranged components than those depicted in FIG. 3. For example, device 300 may include one or more switch fabrics instead of, or in addition to, bus 310. Additionally, or alternatively, one or more components of device 300 may perform one or more tasks described as being performed by one or more other components of device 300.

Bus 310 may include a path that permits communication among the components of device 300. Processor 320 may include a processor, a microprocessor, or processing logic that may interpret and execute instructions. Memory 330 may include any type of dynamic storage device that may store information and instructions for execution by processor 320. Memory 330 may also include any type of non-volatile storage device that stores information for use by processor 320. Input component 340 may include a mechanism that permits a user to input information to device 300, such as a keyboard, a keypad, a button, a switch, etc. Output component 350 may include a mechanism that outputs information to the user, such as a display, a speaker, one or more light emitting diodes (LEDs), etc.

Communication interface 360 may include a transceiver that enables device 300 to communicate with other devices and/or systems via wireless communications, wired communications, or a combination of wireless and wired communications. For example, communication interface 360 may include mechanisms for communicating with another device or system via a network. Communication interface 360 may include an antenna assembly for transmission and/or reception of RF signals. For example, communication interface 360 may include one or more antennas to transmit and/or receive RF signals over the air. Communication interface 360 may, for example, receive RF signals and transmit them over the air to UE device 110/RAN 220, and receive RF signals over the air from RAN 220/UE device 110. In one implementation, for example, communication interface 360 may communicate with a network and/or devices connected to a network. Alternatively, or additionally, communication interface 360 may be a logical component that includes input and output ports, input and output systems, and/or other input and output components that facilitate the transmission of data to other devices.

Device 300 may perform certain operations in response to processor 320 executing software instructions contained in a computer-readable medium, such as memory 330. A computer-readable medium may be defined as a non-transitory memory device. A memory device may include space within a single physical memory device or spread across multiple physical memory devices. The software instructions may be read into memory 330 from another computer-readable medium or from another device. The software instructions contained in memory 330 may cause processor 320 to perform processes described herein. For example, memory 330 may store eSIMs 205 and apply corresponding policy rules described herein. Alternatively, hardwired circuitry may be used in place of or in combination with software instructions to implement processes described herein. Thus, implementations described herein are not limited to any specific combination of hardware circuitry and software.

Figure 4:
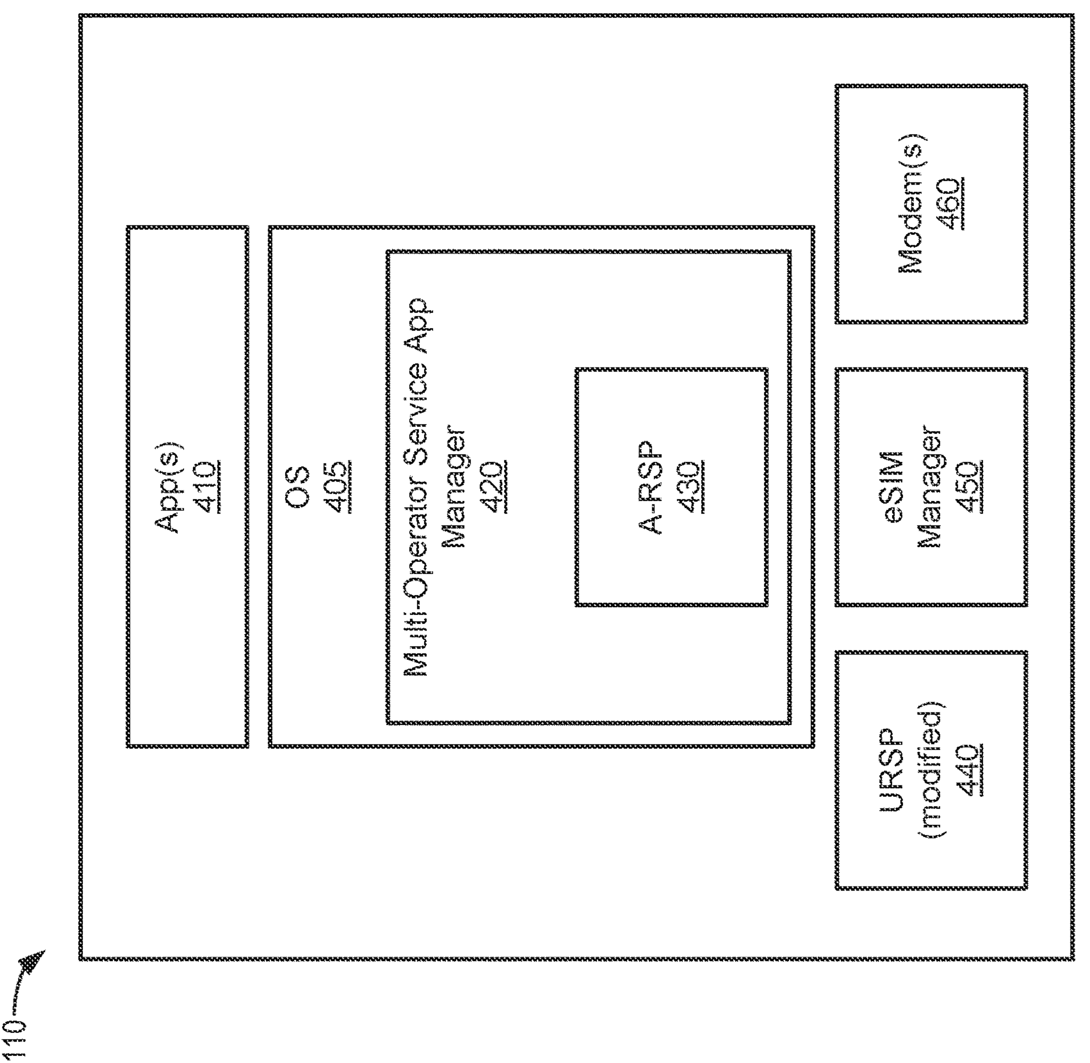
FIG. 4 is a diagram illustrating logical components of a User Equipment (UE) device, according to an implementation.

FIG. 4 is a diagram illustrating logical components of UE device 110 for supporting network slice selection from different service providers, according to implementations described herein. As shown in FIG. 4, UE device 250 may include client application(s) 410, a multi-operator service application manager 420 within an operating system (OS) 405, an A-RSP 430, URSP 440, SIM manager 450, and modem(s) 460.

According to an embodiment, client application 410 may include logic that provides a service pertaining to a software application. For example, client application 410 may provide a streaming service, gaming service, shopping service, social media service, etc., for a user of UE device 110. Client application 410 may typically include or be associated with (e.g., based on configuration settings or an application server request) a traffic descriptor value to indicate a required QOS, etc.

Multi-operator service application manager 420 may establish a connection between client application 410 and a modem 460 that supports an access technology (e.g., WiFi, 5G, LTE, etc.). Multi-operator service application manager 420 may communicate, for example, traffic descriptor values for client application 410 to modem 460. In some implementations, multi-operator service application manager 420 may also provide a governance function to confirm that a client application 410 is authorized for the new traffic descriptor value.

In one implementation, multi-operator service application manager 420 may include a setting on a per-application basis to allow the user to choose what application connects to which service provider either by service provider or network slice. Each service provider may offer specific service performance characteristics. Multi-operator service application manager 420 may apply manual user input and/or automatic selection criteria to select what service provider to use for any given application. For example, multi-operator service application manager 420 may apply an A-RSP rule for a particular application.

A-RSP 430 may include policies to route slice connection requests to preferred network slices on different vendor networks based on the application. A-RSP 430 may identify access preferences for an individual application 410 and/or application groups (e.g., default access preferences). For a group or any individual application, A-RSP 430 may identify preferences for an access network type (e.g., 5G, LTE, WiFi, etc.) and sub-preferences for each network type. Sub-preferences may include, for example, a preferred service provider network and URSP to service the application. In one implementation, A-RSP 430 for an application 410 may be configured by a user (e.g., within the boundaries of a subscription plan for a given mobile network 100). For example, multi-operator service application manager 420 (or the operating system 405) of UE device 110 may provide a user interface to enable the user to configure A-RSP 430. In one implementation, A-RSP 430 may point to an eSIM for a particular network slice/service provider based on the application. In another implementation, A-RSP 430 may point to an eSIM for a particular network slice/service provider based on designated performance requirements (e.g., bandwidth, latency, jitter, reliability, etc.). Other selection criteria may also be used for A-RSP.

UE device 110 may store URSPs 440 for multiple mobile networks 100. The URSP framework for a 5G system provides traffic steering rules for UE devices 110 and enables UE device 110 to determine how a certain application should be handled in the context of traffic routing to an appropriate network slice. According to implementations described herein, URSP 440 may include policy to enable device-side selection and prioritization for network slices accessible through designated eSIMs. For example, URSP 440 may include application hints, define preferences, and/or identify certified applications that can access a particular network slice of a mobile network 100. URSP 440 may be stored, for example, with an eSIM 205 or modem 460 of UE device 110. In one implementation, URSP 440 may be configured via subscription management platform 245 during a user enrollment process with a service provider. That is URSP 440, according to an implementation, may be configured by more than one service provider.

According to another implementation, URSP 440 may control network slice selection among different service providers without the use of A-RSP 430. That is, URSP 440 may be modified from conventional URSP to include rules that may direct between different eSIMs 205 associated with the different service providers. Thus, in the context of eSIM and/or network slice selection, A-RSP 430 and URSP 440 may be collectively or generically referred to herein as "policy rules."

eSIM manager 450 may store eSIMs 205 for use by UE device 110. For example, a user may subscribe to service from a service provider and receive an eSIM 250 in a secure memory of UE device 110. After an eSIM 205 is stored by UE device 110, according to one implementation, eSIM manager 450 may enable a user to enable/disable eSIM 205, which may override A-RSP 430, for example. For example, eSIM manager 450 may include a user interface (e.g., as shown in FIG. 1) on UE device 110 to allow a user to toggle eSIMs (e.g., "eSIM 1," "eSIM2," etc.) on and off.

Modems 460 may include one or more modems that performs processing, modulation, demodulation, and/or other signal processing for communications of UE device 110. According to implementations described herein, modems 460 may include a 5G/NR modem for 5G/NR communications. The 5G/NR modem may store URSP rules and/or access the URSP rules from an eSIM (eSIM "A" 205-1, eSIM "B" 205-2, etc.) or another secure element (not shown) of UE device 110. In one implementation, modem 460 may receive a traffic descriptor value from multi-operator service application manager 420, associate the traffic descriptor value with a network slice, and apply URSP rules to set up a PDU session for a client application 410.

Figure 5A:
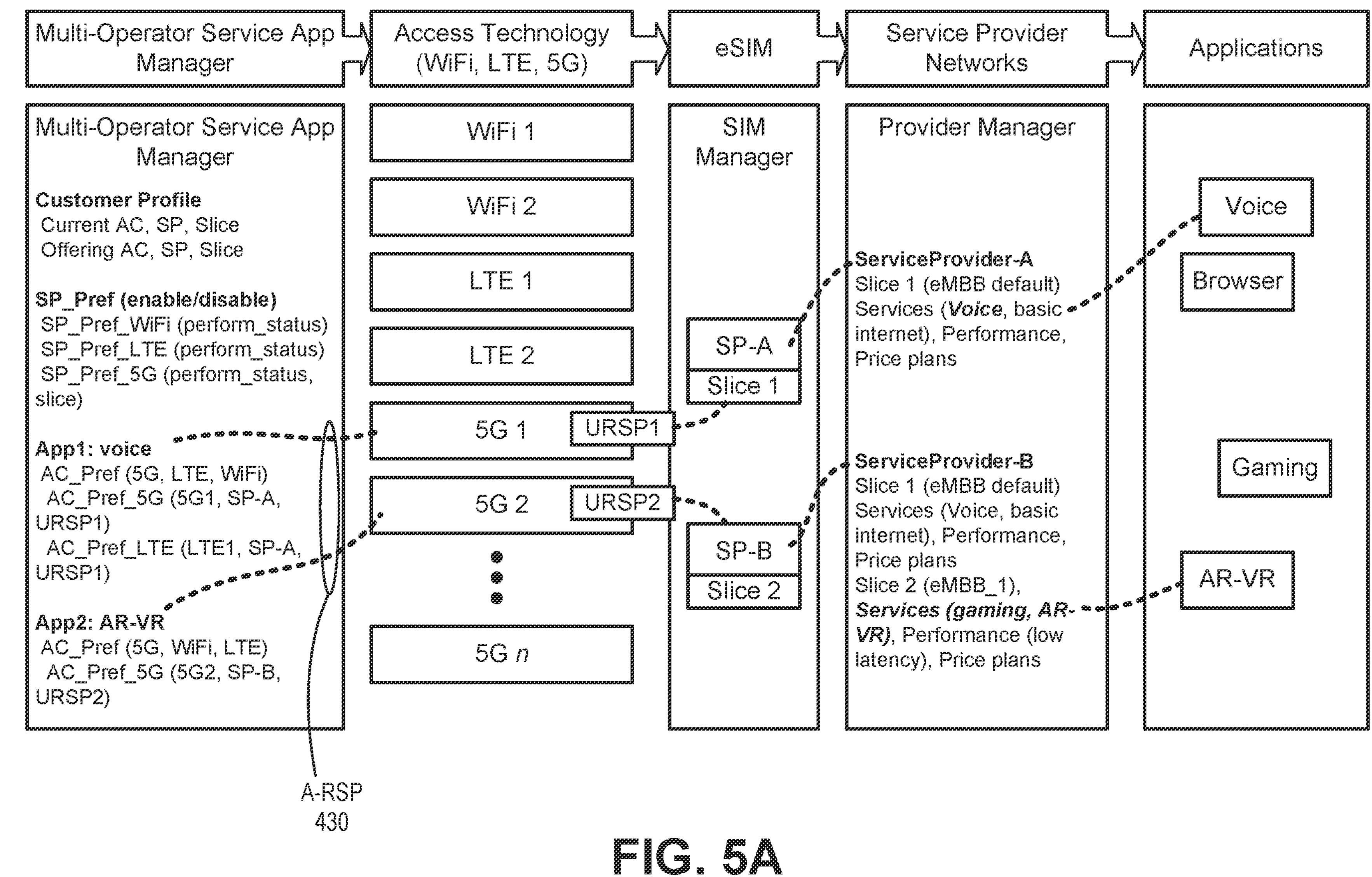
FIGS. 5A and 5B are diagrams illustrating support for network slice selection from different service providers, according to an implementation.
Figure 5B:
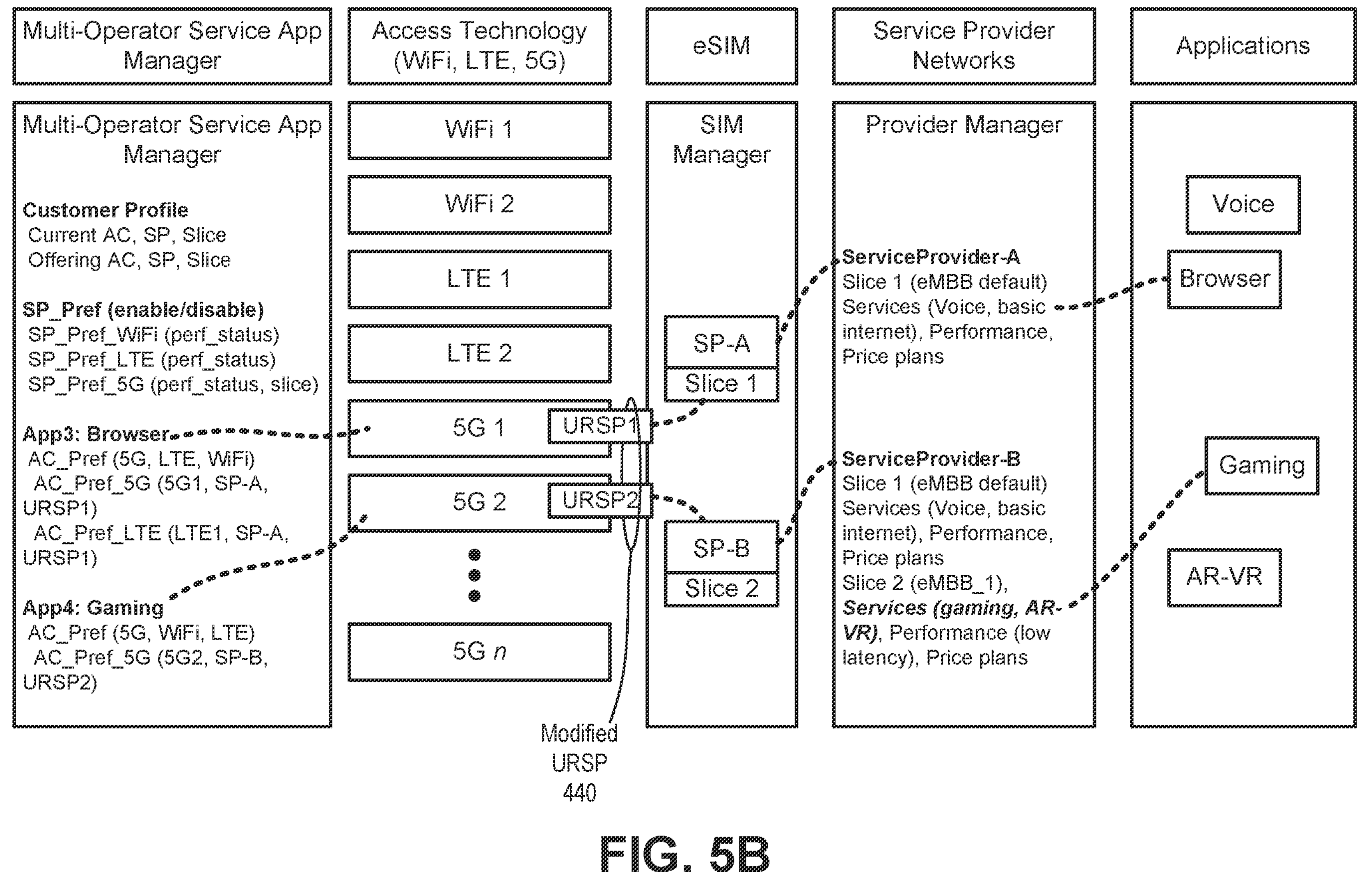

FIGS. 5A and 5B are diagrams illustrating support for network slice selection from different service providers, according to implementations described herein. More particularly, FIG. 5A illustrates network slice selection processes that use A-RSP 430, and FIG. 5B illustrates network slice selection processes that use modified URSP 440.

Referring to FIG. 5A, multi-operator service application manager 420 may store a customer profile that defines available access-type (AC), service providers (SP), and network slices that are available for UE device 110. For each service provider, multi-operator service application manager 420 may store a performance status (e.g., a packet data rate, signal strength, etc.) associated with each network type (e.g., WiFi, LTE, 5G, etc.) that is required to enable to disable use of the corresponding network.

Multi-operator service application manager 420 may store customer preferences for individual applications. For example, individual application preferences may include an access type, such as 5G, then LTE, then WiFi. Preferences for each access type may also be provided. For example, for 5G access or LTE access, a customer may indicate a preferred service provider with corresponding URSP1. In the example of FIG. 5A, App1 (a voice application) may be configured with an access-type (AC) preference of 5G, then LTE, then WiFi. Preferences for App1 may be further configured to use service provider A (SP-A) with URSP1 for 5G connectivity. A second application, App2 (an AR-VR application) may be configured with an access type preference of 5G, then WiFi, then LTE. Preferences for App2 may be further configured to use service provider B (SP-B) with URSP2 for 5G connectivity.

According to an implementation shown in FIG. 5A, multi-operator service application manager 420 may apply A-RSP 430 to direct a session connection request from an application (e.g., App1 or App2). A session connection request may include, for example, a request or order for an application to access a mobile network. For example, a radio resource connection for App1 may be directed to 5G/NR modem applying URSP1 for Service Provider-A. URSP1 may include rules that direct App1 to a network slice on mobile network 100-1 that is configured for voice communications. Using credentials from the corresponding eSIM (e.g., eSIM "A" 205-1) for Service Provider-A, modem 460 may identify the preferred network slice (e.g., "Slice 1") for App1, receive approval, and establish a voice connection over the preferred network slice on mobile network 100-1.

As another example in FIG. 5A, using A-RSP 430, a radio resource connection for App2 may be directed to 5G/NR modem applying URSP2 for Service Provider-B. URSP2 may include rules that direct App2 to a network slice on mobile network 100-2 that is configured for low-latency communication supporting AR-VR. Using credentials from the corresponding eSIM (e.g., eSIM "B" 205-2) for Service Provider-B, modem 460 may identify the preferred network slice (e.g., "Slice 2") for App2, receive approval, and establish a low-latency connection over the preferred network slice on mobile network 100-2.

Referring to FIG. 5B, network slice selection from different MNOs may be enabled by modified URSP 440, without use of A-RSP 430. In the examples of FIG. 5B, customer profiles in multi-operator service application manager 420 may be the same or similar to those described above in connection with FIG. 5A. Based on customer preferences, multi-operator service application manager 420 may direct a session connection request from an application (e.g., App1 or App2) to a 5G modem. URSP1 and URSP2 may be configured with preferences, indications of certified applications, or application hints to guide network slice selection.

According to an implementation shown in FIG. 5B, a radio resource connection for App3 (e.g., a web browser) may be directed to 5G/NR modem applying URSP1 for Service Provider-A. URSP1 may include rules that direct App1 to a network slice on mobile network 100-1 that is configured for basic internet communications. Using credentials from the corresponding eSIM (e.g., eSIM "A" 205-1) for Service Provider-A, modem 460 may identify the preferred network slice (e.g., "Slice 1") for App3, receive approval, and establish a basic internet traffic connection over the preferred network slice on mobile network 100-1.

As another example in FIG. 5B, a radio resource connection for App4 (e.g., a gaming application) may be directed to 5G/NR modem applying URSP2 for Service Provider-B. URSP2 may include rules that direct App4 to a network slice on mobile network 100-2 that is configured for low-latency gaming. Using credentials from the corresponding eSIM (e.g., eSIM "B" 205-2) for Service Provider-B, modem 460 may identify the preferred network slice (e.g., "Slice 2") for App4, receive approval, and establish a low-latency connection over the preferred network slice on mobile network 100-2.

FIGS. 5A and 5B represent simplified overview of network slice selection using different eSIMs. Depending on the implementation, different networks and components than those illustrated in FIGS. 5A and 5B may be used.

Figure 6:
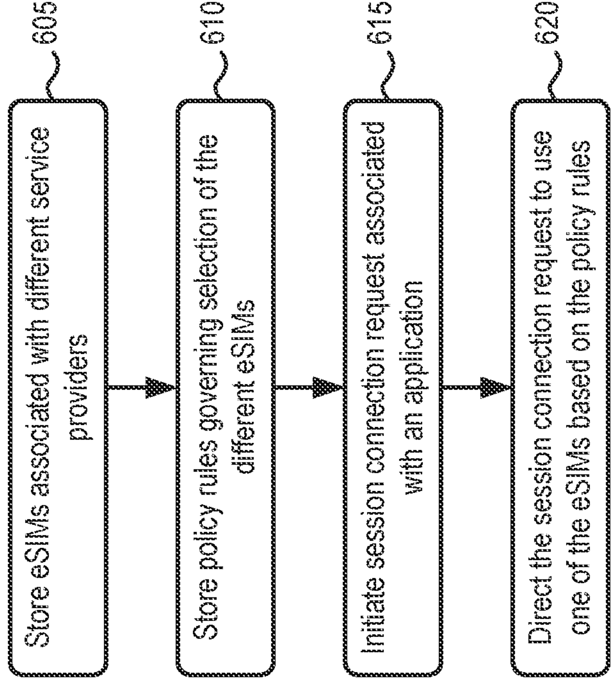
FIGS. 6 and 7 are flow diagrams illustrating processes for performing network slice selection using different embedded Subscriber Identity Modules (eSIMs), according to implementations described herein.
Figure 7:
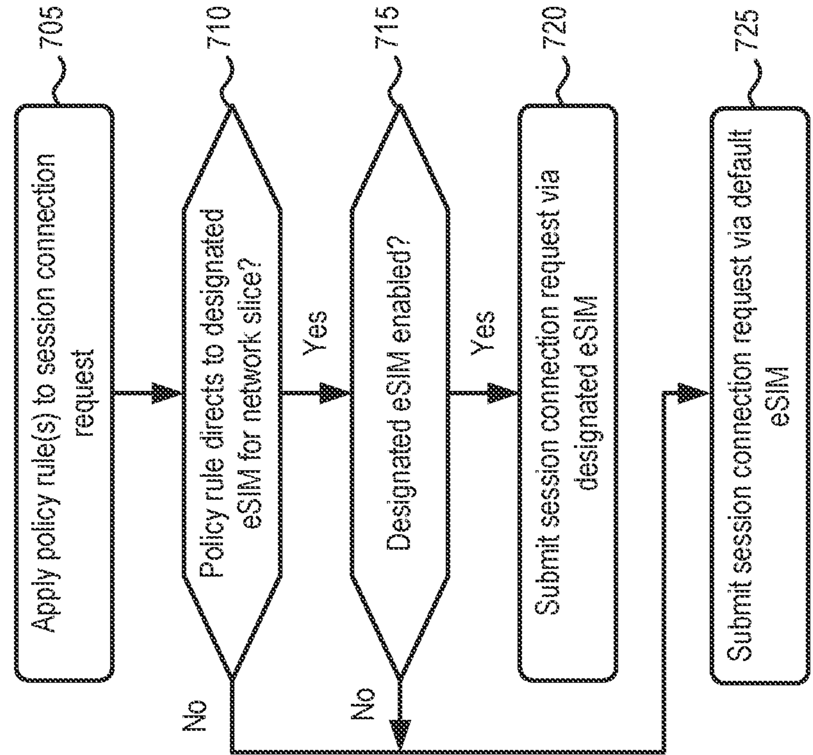
Figure 7:
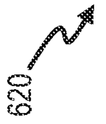

FIGS. 6 and 7 are flows diagram illustrating a process 600 for performing network slice selection using different eSIMs. In one implementation, process 600 may be implemented by UE device 110. In another implementation, process 600 may be implemented by UE device 110 in conjunction with one or more other devices in network environment 200, such as subscription management platforms 245. Process 600 may enable UE-based selection of network slices from different service providers using previously-provisioned eSIMs.

Process 600 may include storing eSIMs associated with different service providers (block 605). For example, a user may subscribe to services from multiple service providers with different mobile networks (e.g., having different PLMN IDs). Each service provider may use a subscription management platform 245 to provision UE device 110 with an eSIM (e.g., eSIMs 205) for a corresponding mobile network (e.g., an eSIM 205-1 associated with a first mobile network and a second eSIM 205-2 associated with a second mobile network).

Process 600 may further include storing policy rules governing selection of the different eSIMs (block 610). For example, in conjunction with subscription parameters for each service provider, the different subscription management platforms 245 may provision UE device 110 with policy rules to govern selection of the different eSIMs. Some policy rules may be received from a first provisioning platform (e.g., subscription management platforms 245-1) associated with the first service provider and some other policy rules may be received from a second provisioning platform (e.g., subscription management platforms 245-1) associated with the second service provider. The policy rules may, for example, designate the first eSIM as a default and limit use of the second eSIM to a network slice (or one or more designated slices) on the second mobile network. According to one implementation, the policy rules for selecting an eSIM may be stored in the URSP (e.g., modified URSP 440). According to another implementation, the policy rules for selecting an eSIM may be stored in A-RSP 430 (e.g., separate from the URSP).

Process 600 may also include initiating a session associated with an application (block 615) and directing a session connection request to use one of the eSIMs based on the policy rules (block 620). For example, a client application (e.g., application 410) may initiate a request for network service. In response to a session connection request from an application, UE device 110 (e.g., multi-operator service application manager 420) may direct the session connection request through the appropriate eSIM (e.g., one of the first eSIM or the second eSIM) based on the policy rules as applied to the requesting application.

Process block 620 may further include the process blocks shown in FIG. 7. Referring to FIG. 7, process block 620 may include applying the policy rules to the session connection request (block 705) and determining if the policy rule points to a designated eSIM for a network slice (block 710). For example, UE device 110 may apply policy rules in A-RSP 430 and/or URSP 440 to enable eSIM capabilities on a network slice basis. For example, the policy rules may identify particular applications, application types, service requirements, etc. that should receive service from a network slice from a designated eSIM/service provider. Alternatively, a default eSIM/service provider may be used if there is no designated eSIM/service provider associated with a session connection request.

If the policy rule points to a designated eSIM (block 710—Yes), process block 620 may also include determining if a designated eSIM is enabled (block 715). For example, if the policy rules direct a request from application 410 to a particular eSIM, UE device 110 may determine if the eSIM is activated (e.g., in eSIM manager 450).

If the designated eSIM is enabled (block 715—Yes), process block 620 may include submitting the session connection request via the designated eSIM (block 720). For example, if the policy rules in A-RSP 430 and/or URSP 440 direct the session connection request through an eSIM that is enabled/active in eSIM manager 450, UE device 110 may proceed to submit the session connection request via the selected eSIM.

If the policy rule does not point to a designated eSIM (block 710—No) or if the designated eSIM is not enabled (block 715—No), process block 620 may include submitting the session connection request via a default eSIM (block 725). For example, if none of the policy rules in A-RSP 430 and/or URSP 440 direct the session connection request through a designated eSIM that is enabled/active in eSIM manager 450, UE device 110 may proceed to submit the session connection request via a default eSIM (e.g., an eSIM for a primary service provider).

Systems and methods described herein enable network slice selection from different service providers using embedded Subscriber Identity Modules (eSIMs). A user equipment (UE) device stores a first eSIM associated with a first service provider of a first mobile network and a second eSIM associated with a second service provider of a second mobile network. The UE device also stores policy rules governing selection of the first eSIM and the second eSIM, wherein the policy rules limit use of second eSIM to a network slice on the second mobile network. The UE device initiates a session connection request associated with an application and directs the session connection request through one of the first eSIM or the second eSIM based on the policy rules.

The foregoing description of embodiments provides illustrations but is not intended to be exhaustive or to limit the embodiments to the precise form disclosed. In the preceding description, various embodiments have been described with reference to the accompanying drawings. However, various modifications and changes may be made thereto, and additional embodiments may be implemented, without departing from the broader scope of the invention as set forth in the claims that follow. The description and drawings are accordingly to be regarded as illustrative rather than restrictive.

In addition, while series of blocks have been described with regard to the processes illustrated in FIGS. 6 and 7, the order of the blocks and/or signals may be modified according to other embodiments. Further, non-dependent blocks may be performed in parallel. Additionally, other processes described in this description may be modified and/or non-dependent operations may be performed in parallel.

The embodiments described herein may be implemented in many different forms of software executed by hardware. For example, a process or a function may be implemented as "logic" or as a "component." The logic or the component may include, for example, hardware (e.g., processor 320, etc.), or a combination of hardware and software. The embodiments have been described without reference to the specific software code since the software code can be designed to implement the embodiments based on the description herein and commercially available software design environments/languages.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory storage medium that stores data and/or information, such as instructions, program code, data structures, program modules, an application, etc. The program code, instructions, application, etc., is readable and executable by a processor (e.g., processor 320) of a computational device. A non-transitory storage medium includes one or more of the storage mediums described in relation to memory 330.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction described in the present application should be construed as critical or essential to the embodiments described herein unless explicitly described as such.

What is claimed is:

1. A method, comprising:

storing, by a user equipment (UE) device, a first embedded Subscriber Identity Module (eSIM) associated with a first service provider of a first mobile network and a second eSIM associated with a second service provider of a second mobile network;

storing, by the UE device, policy rules governing selection of the first eSIM and the second eSIM, wherein the policy rules limit use of the second eSIM to a network slice on the second mobile network, and wherein policy rules are selected by a user of the UE device and stored as an Application-Route Selection Policy (A-RSP) that is separate from a UE Route Selection Policy (URSP);

initiating, on the UE device, after storing the policy rules, a session connection request associated with an application; and directing, by the UE device, the session connection request through one of the first eSIM or the second eSIM based on the policy rules.

2. The method of claim 1, wherein the policy rules designate the first eSIM as a default.

3. The method of claim 1, further comprising:
receiving some of the policy rules from a first provisioning platform associated with the first service provider, and
receiving others of the policy rules from a second provisioning platform associated with the second service provider.

4. The method of claim 1, further comprising:
receiving, by the UE device, a selection of the user to designate, for the application, a preferred network slice from the second service provider.

5. The method of claim 1, wherein the application includes a traffic descriptor value, and wherein the method further comprises:
confirming, by the UE device, that the application is authorized for the traffic descriptor value.

6. The method of claim 1, wherein the first eSIM includes credentials for the first mobile network, and wherein the second eSIM includes different credentials for the second mobile network.

7. The method of claim 1, further comprising:
storing, by the UE device, a third eSIM associated with a third service provider of a third mobile network.

8. The method of claim 1, wherein the policy rules include rules to use the second eSIM for a designated application.

9. The method of claim 1, wherein the policy rules include rules to use one of the first or second eSIMs for one or more application with designated performance requirements.

10. A user equipment (UE) device comprising:
one or more processors configured to:
store a first embedded Subscriber Identity Module (eSIM) associated with a first service provider of a first mobile network and a second eSIM associated with a second service provider of a second mobile network;
store policy rules governing selection of the first eSIM and the second eSIM, wherein the policy rules limit use of the second eSIM to a network slice on the second mobile network, and wherein policy rules are selected by a user of the UE device and stored as an Application-Route Selection Policy (A-RSP) that is separate from a UE Route Selection Policy URSP);
initiate, after storing the policy rules, a session connection request associated with an application; and
direct the session connection request through one of the first eSIM or the second eSIM based on the policy rules.

11. The UE device of claim 10, wherein the policy rules designate the first eSIM as a default.

12. The UE device of claim 10, wherein the one or more processors are further configured to:
receive some of the policy rules from a first provisioning platform associated with the first service provider, and
receive other of the policy rules from a second provisioning platform associated with the second service provider.

13. The UE device of claim 10, wherein the one or more processors are further configured to:
receive a selection of the user to designate, for the application, a preferred network slice from the second service provider.

14. The UE device of claim 13, wherein the application includes a traffic descriptor value, and wherein the one or more processors are further configured to:
confirm that the application is authorized for the traffic descriptor value.

15. The UE device of claim 10, wherein the policy rules include rules to use the second eSIM for a designated application or an application type with designated performance requirements.

16. The device of claim 10, wherein the first eSIM includes credentials for the first mobile network, and wherein the second eSIM includes different credentials for the second mobile network.

17. A non-transitory computer-readable medium containing instructions executable by at least one processor, the non-transitory computer-readable medium comprising one or more instructions for:
storing, by a user equipment (UE) device, a first embedded Subscriber Identity Module (eSIM) associated with a first service provider of a first mobile network and a second eSIM associated with a second service provider of a second mobile network;
storing, by the UE device, policy rules governing selection of the first eSIM and the second eSIM, wherein the policy rules limit use of the second eSIM to a network slice on the second mobile network, and wherein policy rules are selected by a user of the UE device and stored as an Application-Route Selection Policy (A-RSP) that is separate from a UE Route Selection Policy (URSP);
initiating, on the UE device, after storing the policy rules, a session connection request associated with an application; and
directing, by the UE device, the session connection request through one of the first eSIM or the second eSIM based on the policy rules.

18. The non-transitory computer-readable medium of claim 17, further comprising one or more instructions for:
receiving a selection of the user to designate, for the application, a preferred network slice from the second service provider.

19. The non-transitory computer-readable medium of claim 17, further comprising one or more instructions for:
storing, by the UE device, a third eSIM associated with a third service provider of a third mobile network.

20. The non-transitory computer-readable medium of claim 17, wherein the policy rules include rules to use the second eSIM for a designated application, and
wherein the policy rules designate the first eSIM as a default.

* * * * *